United States Patent
Urushihara et al.

(10) Patent No.: US 6,267,097 B1
(45) Date of Patent: Jul. 31, 2001

(54) COMPRESSION SELF-IGNITING GASOLINE ENGINE

(75) Inventors: Tomonori Urushihara, Yokohama; Koji Hiraya; Kazuya Hasegawa, both of Yokosuka; Ken Naitoh, Yonezawa; Tsuyoshi Taniyama, Yokosuka; Akihiro Ilyama, Zushi, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/569,304

(22) Filed: May 11, 2000

(30) Foreign Application Priority Data

May 12, 1999 (JP) .................................. 11-131671
Jun. 18, 1999 (JP) .................................. 11-172752

(51) Int. Cl.[7] .............................. F02B 11/02; F02B 3/10
(52) U.S. Cl. ...................... 123/305; 123/299; 123/90.15
(58) Field of Search ................................. 123/295, 305, 123/299, 90.15

(56) References Cited

U.S. PATENT DOCUMENTS

| | | | |
|---|---|---|---|
| 5,517,954 | 5/1996 | Melchior | 123/65 W |
| 5,746,163 | 5/1998 | Green | 123/65 VC |
| 5,865,153 | * 2/1999 | Matsumoto | 123/299 |
| 6,067,954 | * 5/2000 | Kudou et al. | 123/295 |
| 6,112,716 | * 9/2000 | Tachibana | 123/305 |
| 6,125,816 | * 10/2000 | Inoue | 123/299 |

FOREIGN PATENT DOCUMENTS

| | | |
|---|---|---|
| 0 943 793 | 9/1999 | (EP) . |
| 7-332141 | 12/1995 | (JP) . |
| 9-203307 | 8/1997 | (JP) . |

OTHER PUBLICATIONS

Masuda Goji, "Gasoline Direct Injection Engine.", Patent Abstracts of Japan, vol. 2000, No. 2, 11–324778, Nov. 26, 1999, Abstract.

* cited by examiner

*Primary Examiner*—Erick Solis
(74) *Attorney, Agent, or Firm*—Foley & Lardner

(57) ABSTRACT

Stroke cycles of a self-igniting gasoline engine (10) comprising an intake stroke, compression stroke, power stroke and exhaust stroke are performed sequentially by a piston (12), and self-ignition of the fuel mixture is performed by compression of the fuel mixture in the compression stroke. The strokes of the piston (12) are detected by a sensor (23), and an electronic control unit (1) controls a valve timing adjustment mechanism (15, 18) so that a sealed period occurs when both an exhaust valve (17) and intake valve (14) are closed in the vicinity of top dead center of the exhaust stroke. The electronic control unit (1) also controls the fuel injection timing of a fuel injector (19) so that fuel is injected into the combustion chamber (11) during the sealed period. The fuel injected into the hot gas in the sealed combustion chamber (11) causes pre-combustion reactions, and thereby modifies the gasoline composition to a more reactive composition containing aldehydes so that compression self-ignition occurs easily.

15 Claims, 15 Drawing Sheets

FIG. 3A  EXHAUST STROKE 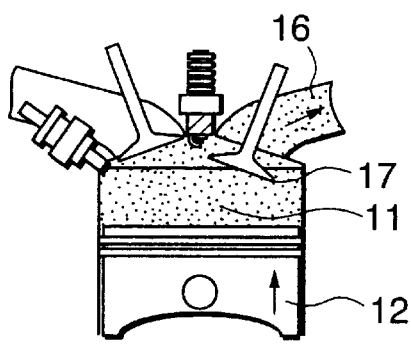
FIG. 3B  CLOSED STATE 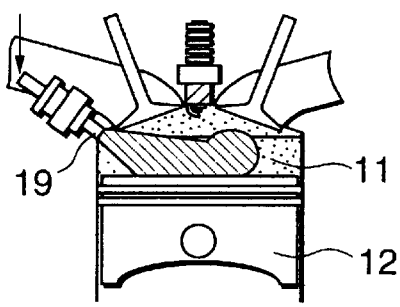
FIG. 3C  INTAKE STROKE 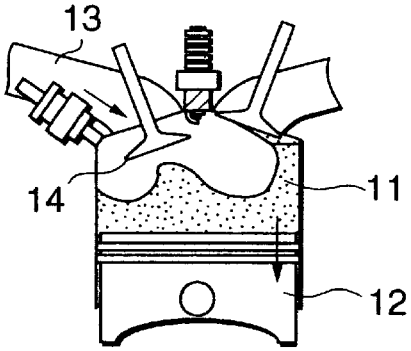
FIG. 3D  COMPRESSION STROKE 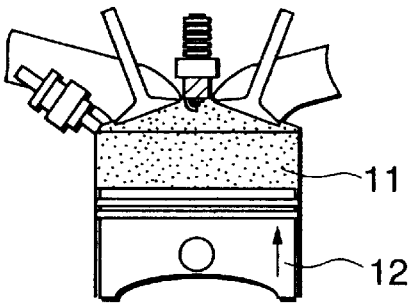
FIG. 3E  COMPRESSION TDC 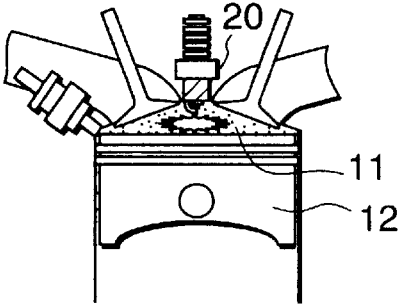

FIG. 4A  EXHAUST STROKE 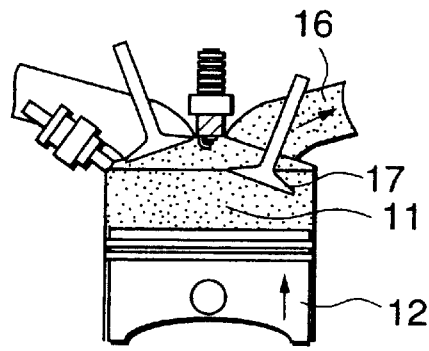
FIG. 4B  INTAKE STROKE 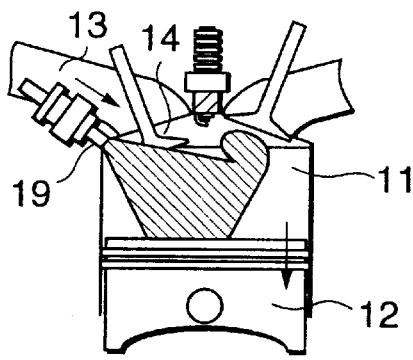
FIG. 4C  COMPRESSION STROKE 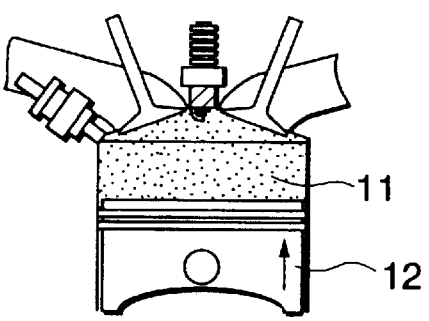
FIG. 4D  COMPRESSION TDC 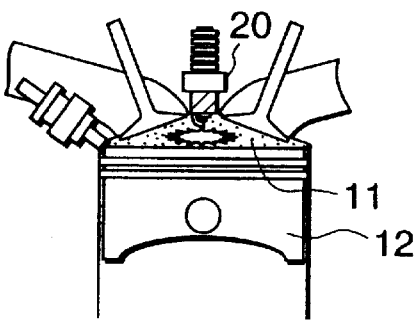

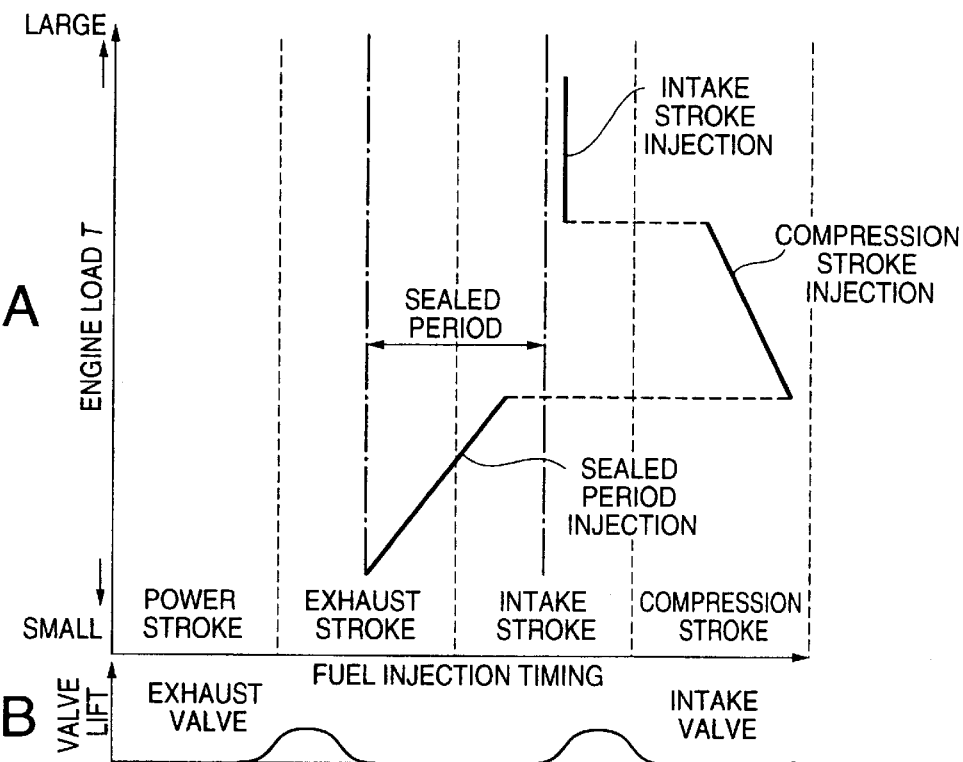
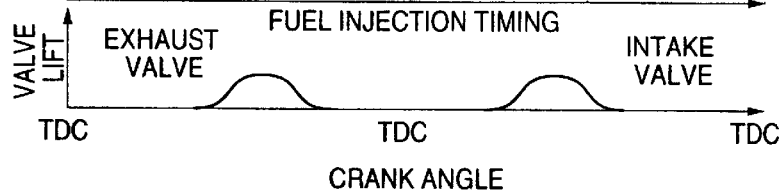

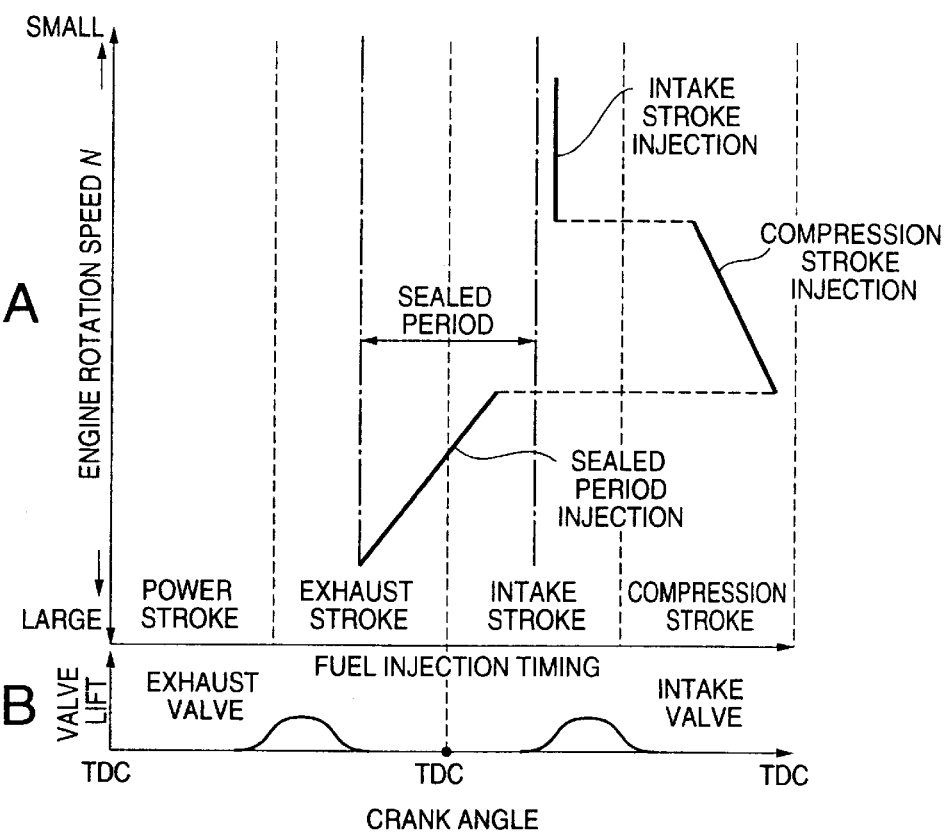
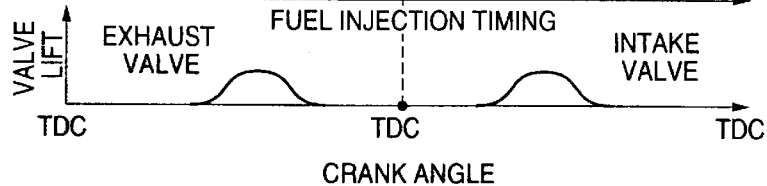

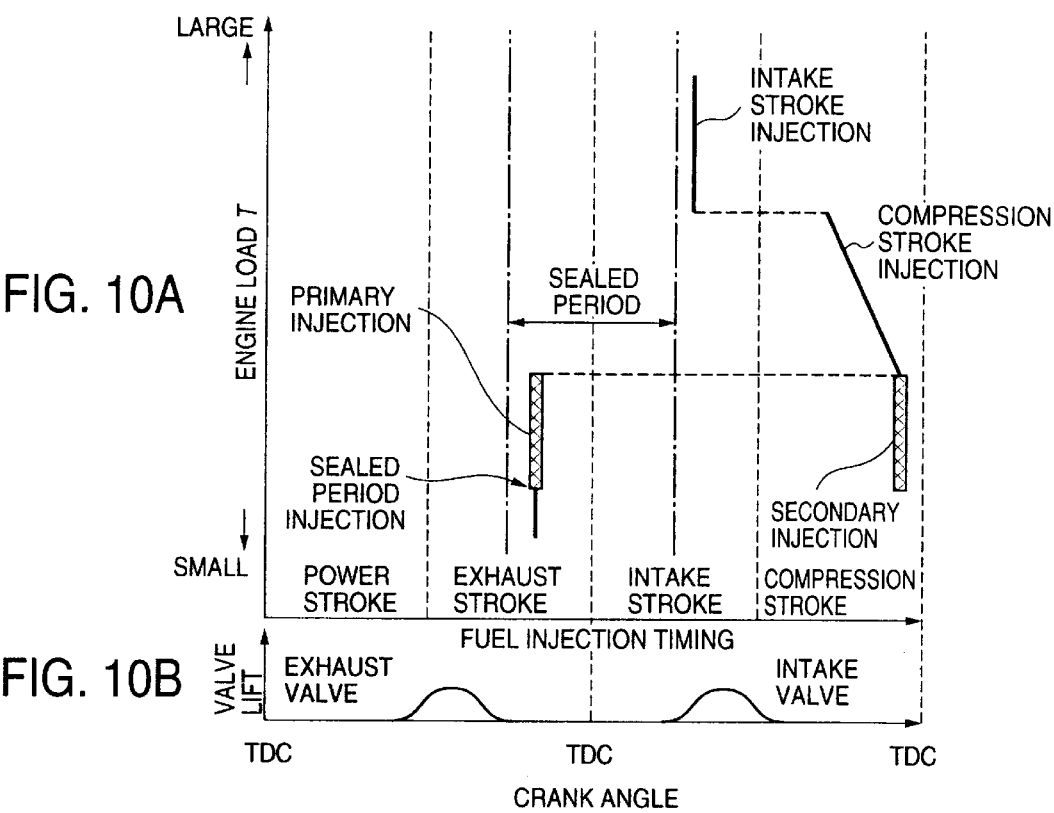

COMPRESSION SELF-IGNITING GASOLINE ENGINE

FIELD OF THE INVENTION

This invention relates to a gasoline engine which performs compression self-ignition combustion.

BACKGROUND OF THE INVENTION

Tokkai Hei 7-332141 published by the Japanese Patent Office in 1995 discloses a gasoline engine which is made to perform self-ignition to improve heat efficiency.

In this engine, gasoline fuel is injected into an intake port to form a premixed fuel mixture, and causes self-ignition by compressing the premixed fuel mixture with the high compression ratio of a direct injection diesel engine, i.e., 14 to 20. As self-ignition occurs at plural locations in the combustion chamber, the combustion period can be shortened, even in the case of an fuel mixture having a lean air-fuel ratio, compared with the case where spark ignition is performed. For this reason, running at a lean air-fuel ratio which was impossible in a spark ignition engine can be performed, and fuel consumption can be largely reduced.

This engine is further equipped with a spark plug, and performs spark ignition under running conditions which demand a fuel mixture in the vicinity of the stoichiometric air-fuel ratio, such as running on full load.

SUMMARY OF THE INVENTION

However, if the compression ratio is increased, when spark ignition is performed in an fuel mixture in the vicinity of the stoichiometric air-fuel ratio, knocking easily occurs. In order to avoid knocking, it is necessary to limit the advance of the ignition timing. However, limiting the advance of the ignition timing largely reduces the generated torque compared with a spark ignition gasoline engine of ordinary compression ratio.

It is therefore an object of this invention to decrease the compression ratio of a gasoline engine which uses compression self-ignition and spark ignition in conjunction.

It is a further object of this invention to improve the condition in a combustion chamber of a gasoline engine for performing compression self-ignition.

In order to achieve the above objects, this invention provides a compression self-igniting gasoline engine wherein stroke cycles comprising an intake stroke, a compression stroke, a power stroke and an exhaust stroke are repeated sequentially by a piston, and self-ignition of a fuel mixture is performed by compression of the fuel mixture in the compression stroke. The engine comprises a fuel injector facing the combustion chamber, an intake valve which introduces intake air to the combustion chamber, an exhaust valve which ejects burnt gas from the combustion chamber, a sensor which detects the strokes of the piston, a valve timing adjustment mechanism which varies an open/close timing of the intake valve and the exhaust valve, and a microprocessor. The microprocessor is programmed to control the valve timing adjustment mechanism so that a sealed period when both the exhaust valve and the intake valve are closed, appears near top dead center of the exhaust stroke and control the fuel injection timing of the fuel injector so that the fuel is injected into the combustion chamber in the sealed period.

This invention also provides a compression self-igniting gasoline engine comprising a fuel injector facing the combustion chamber, an intake valve which introduces intake air to the combustion chamber, an exhaust valve which ejects burnt gas from the combustion chamber, a mechanism for detecting the strokes of the piston, a mechanism for varying an open/close timing of the intake valve and the exhaust valve, a mechanism for controlling the valve timing adjustment mechanism so that a sealed period when both the exhaust valve and the intake valve are closed, appears near top dead center of the exhaust stroke, and a mechanism for controlling the fuel injection timing of the fuel injector so that the fuel is injected into the combustion chamber in the sealed period.

The details as well as other features and advantages of this invention are set forth in the remainder of the specification and are shown in the accompanying drawings.

BRIEF DESCRIPTION OF THE DRAWINGS

FIGS. 3A–3E are diagrams showing various states of a combustion chamber when the engine is running on low load.

FIGS. 4A–4D are diagrams showing various states of the combustion chamber when the engine is running on high load.

FIGS. 5A and 5B are diagrams describing the relation between the engine load, valve lift and a fuel injection timing.

FIGS. 6A and 6B are diagrams describing the relation between an engine rotation speed, the valve lift and fuel injection timing.

FIGS. 10A, 10B are similar to FIGS. 5A, 5B but showing a second embodiment of this invention.

DESCRIPTION OF THE PREFERRED EMBODIMENTS

Figure 1:
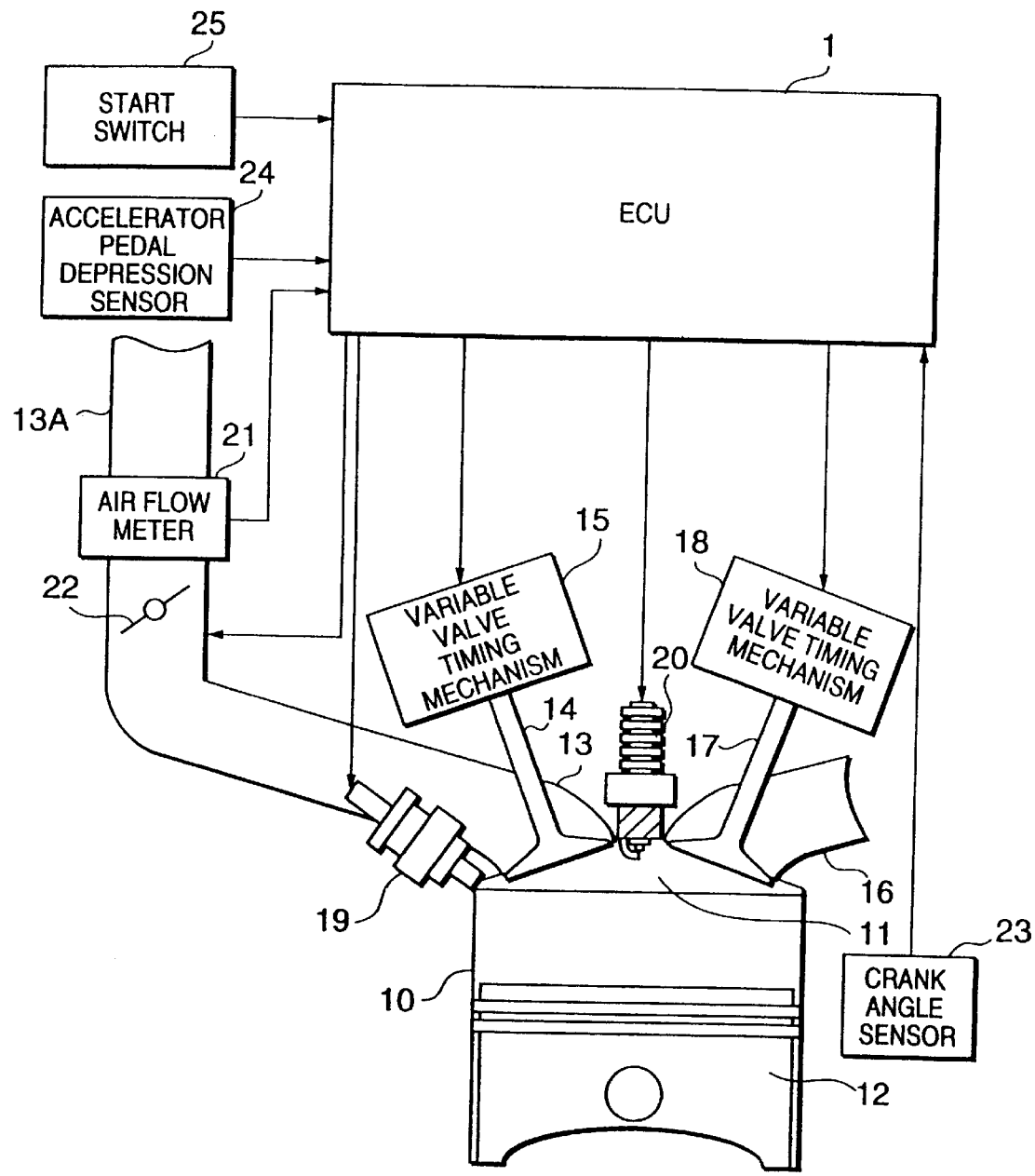
FIG. 1 is a schematic diagram of a compression self-igniting gasoline engine according to this invention.

Referring to FIG. 1 of the drawings, a four stroke cycle compression self-igniting gasoline engine 10 for vehicles according to this invention comprises a combustion chamber 11 which is expanded and contracted by a reciprocating piston 12.

An intake port 13 and exhaust port 16 facing the combustion chamber 11 are formed in the engine 10.

An intake valve 14 is provided in the intake port 13.

An intake passage 13A is connected to the intake port 13. Air is aspirated from the intake passage 13A into the combustion chamber 11 through the intake port 13, when the intake valve 14 is open. A throttle 22 which adjusts the intake air flowrate is provided in the intake passage 13A. A fuel injector 19 and spark plug 20 are provided in the engine 10 facing the combustion chamber 11. Fuel injected into the combustion chamber 11 from the fuel injector 19 is mixed with the air aspirated from the intake port 13. The piston 12 compresses this fuel mixture.

The compressed fuel mixture burns by self-ignition due to the heat of compression, or by spark ignition due to a spark of the spark plug 20.

An exhaust valve 17 is provided in the exhaust port 16. Burnt gas is discharged into the atmosphere through an exhaust passage, not shown, from the exhaust port 16, when the exhaust valve 17 is open.

A valve timing adjustment mechanism 15 is provided to change the open/close timing of the intake valve 14, and a valve timing adjustment mechanism 18 is provided to change the open/close timing of the exhaust valve 17. The valve timing adjustment mechanisms 15, 18 may be devices which are provided with plural cams with different profiles for driving the valve at different timings and a mechanism for selectively applying one of these cams. Such devices are disclosed by Tokkai Hei 9-203307 published by the Japanese Patent Office in 1997. Alternatively, a solenoid valve open/close mechanism may also be used.

The fuel injection amount and injection timing of the fuel injector 19, the spark timing of the spark plug 20, the opening of the throttle 22, and the open/close timing of the intake valve 14 and the exhaust valve 17 by the valve timing adjustment mechanisms 15, 18, are controlled by signals output from an electronic control unit 1 (abbreviated hereafter as ECU 1).

To perform this control, signals from an air flow meter 21 which detects the intake air flowrate in the intake passage 13A, a crank angle sensor 23 which detects a crank angle of the engine 10, an accelerator pedal depression sensor 24 which detects the depression amount of an accelerator pedal, and a starter switch 25 which detects startup of the engine 10, are input to the ECU The ECU 1 comprises a microcomputer equipped with a central processing unit (CPU), read-only memory (ROM), random access memory (RAM), and input/output interface (I/O interface).

With the above construction, the electronic control unit 1 determines whether to perform spark ignition combustion or compression self-ignition combustion according to a rotation speed N calculated from the crank angle of the engine 10, and engine load T represented by the depression amount of the accelerator pedal. According to the determination result, the throttle opening, valve timing of the intake valve 14 and exhaust valve 17, fuel injection amount and injection timing of the fuel injector 19, and ignition timing of the spark plug 20 are determined, and corresponding signals are output.

Figure 2A:
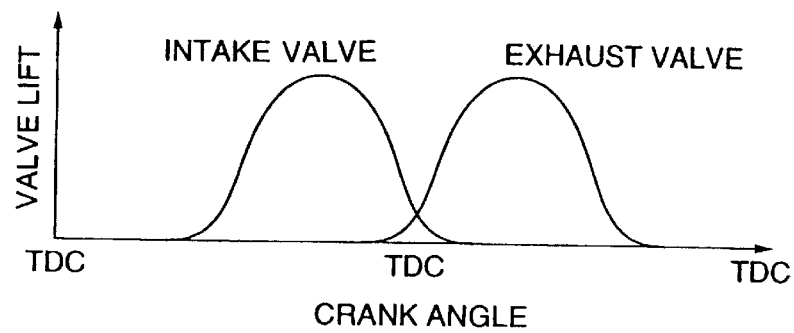
FIGS. 2A and 2B are timing charts describing a valve lift timing of an intake valve and exhaust valve with which the engine is equipped.

Next, the control of valve timing performed by the ECU 1 will be described referring to FIGS. 2A and 2B. When spark ignition combustion is performed, the ECU 1 controls the intake valve 14 and exhaust valve 17 so that their valve opening periods overlap in the vicinity of compression top dead center (TDC) of the exhaust stroke of the piston 12 as shown in FIG. 2A.

Figure 2B:
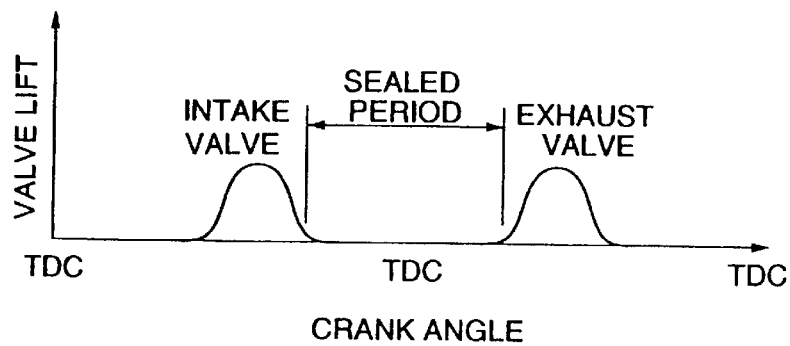

When compression self-ignition combustion is performed, the valve closing periods of the intake valve 14 and exhaust valve 17 overlap in the vicinity of compression top dead center (TDC) of the exhaust stroke of the piston 12, as shown in FIG. 2B. During this overlap period, the combustion chamber 11 is sealed.

Next, the state of each stroke during low load operation of the engine 10 will be described with reference to FIGS. 3A–3E.

During low load, valve timings for compression self-ignition combustion shown in FIG. 2B are applied by the valve timing adjustable mechanisms 15 and 18.

In the first half of the exhaust stroke of the piston 12, exhaust gas from the combustion chamber 11 is ejected from the exhaust valve 17 via the exhaust port 16 as in an ordinary engine, as shown in FIG. 3A.

In the second half of the exhaust stroke, the exhaust valve 17 closes and the ascending piston 12 compresses the exhaust gas in the combustion chamber 11, as shown in FIG. 3B. The exhaust gas reaches a high temperature and pressure due to this compression. At the end of the exhaust stroke, fuel is injected from the fuel injector 19 into the combustion chamber 11 which is in a sealed state.

Pre-combustion reactions due to the injection of fuel into the high temperature gas occur, and the composition of the gasoline changes to a more reactive composition containing aldehydes. The degree of this composition change depends on the time for which gasoline remains in the hot gas. If the fuel injection timing is advanced, the gasoline composition is brought to a high level just before combustion starts. Conversely, if the fuel injection timing is retarded, the composition change takes place only in a small part of the injected fuel.

In the first half of the following intake stroke, the fuel mixture containing gasoline of modified composition is expanded to near atmospheric pressure while the intake valve 14 and exhaust valve 17 remain closed. In the second half of the intake stroke, the intake valve 14 is opened and fresh air is aspirated from the intake port 13 to the combustion chamber 11, as shown in FIG. 3C.

In the compression stroke, the mixture of hot air-fuel of modified composition and fresh air is compressed as shown in FIG. 3D, and compression self-ignition eventually occurs as shown in FIG. 3E.

Due to the increase of temperature and pressure of the fuel mixture in the combustion chamber 11, and the effect of the compositional modification, this compression self-ignition takes place at a lower compression ratio than that of a prior art compression self-ignition engine. Therefore, the compression ratio of the engine 10 may be set to 10–20, i.e., the lower limit can be set lower than in a prior art compression self-ignition engine. If the compression ratio is lowered, even when running under full load when spark ignition is performed, knocking does not easily occur even when the ignition timing is considerably advanced.

For this reason, a large torque can be generated by advancing the ignition timing.

In a power stroke of the piston 12, gas which underwent self-ignition combustion depresses the piston 12, and generates an output torque.

Next, the state of each stroke during high load operation of the engine 10 will be described referring to FIGS. 4A–4D.

During high load operation, the valve timing for spark ignition combustion shown in FIG. 2A is applied by the valve timing adjustment mechanisms 15 and 18.

In this case, exhaust, intake, compression and power strokes are performed as in the case of an ordinary spark ignition gasoline engine, and ignition of the fuel mixture by the spark plug 20 is performed near compression TDC as in an ordinary spark ignition gasoline engine.

Next, control of compression self-igniting combustion during low load operation performed by the electronic control unit 1 will be described.

Compression self-ignition is affected by the temperature in the combustion chamber 11, pressure, fuel concentration and the composition change degree of the fuel in the combustion chamber 11, and the compression self-ignition timing is advanced more the larger these factors are. In other words, compression ignition takes place at a lower compression ratio. However, from the viewpoint of heat efficiency of the engine 10, it is desirable that compression self-ignition is started near compression TDC.

When the engine load is high, the fuel concentration in the fuel mixture is high, so the compression self-ignition timing is advanced. Conversely, when the engine load is low, the fuel concentration in the fuel mixture is low, so the compression self-ignition timing is retarded. Therefore, in order to obtain a fixed compression self-ignition timing for different loads, the fuel injection timing must be changed according to the engine load.

Referring to FIGS. 5A and 5B, three kinds of fuel injection are performed alternately as the load T of the engine 10 varies during compression self-ignition combustion. These are a sealed period injection in the low load region, a compression stroke injection in the medium load region, and an intake stroke injection in the high load region.

The sealed period injection injects fuel when the combustion chamber 11 is sealed. The injection timing is also advanced the lower the load. This means that the composition change in gasoline fuel is performed to a high degree the lower the load.

The compression stroke injection injects fuel in the compression stroke of the piston 12. This promotes compression self-ignition by producing an enriched fuel concentration layer in the combustion chamber (11), without changing the composition of the injected fuel. Further, in the compression stroke injection, the fuel injection timing is retarded the lower the load, and diffusion of the injected fuel in the combustion chamber 11 is suppressed.

Fuel reforming and fuel mixture stratification are both means to promote compression self-ignition, but when these are compared, there is the following difference. In the latter half of the compression stroke, the temperature of the gas in the combustion chamber 11 rises sharply due to compression, but the temperatures of the wall surface forming the combustion chamber 11 and the piston 12 cannot catch up with this, and as a result, the temperature of the wall surface or the piston 12 is low compared with the gas temperature.

Therefore, gas in contact with the wall surface is at a lower temperature than the gas the near the center of the combustion chamber 11, and a thermal boundary layer appears between these gases at different temperature. This phenomenon is called wall surface quenching.

In compression self-ignition combustion, unlike the case of spark ignition, flame propagation does not take place, so unburnt material remains in the fuel mixture on the low temperature side of the thermal boundary layer, and this easily generates hydrocarbons (HC).

However, in stratified combustion, the fuel mixture is concentrated around the spark plug 20, and fuel does not diffuse to the low temperature side of the thermal boundary layer. Therefore, generation of hydrocarbons (HC) can be suppressed.

That is, in compression self-ignition combustion of a stratified fuel mixture, there is an advantage in that less hydrocarbons (HC) are produced than in compression self-ignition combustion by combined fuel reforming and uniform combustion. The reason why the electronic control unit 1 applies fuel mixture stratification in the medium negative load region without depending solely on fuel reforming to promote compression self-ignition, is due to this factor.

The intake stroke injection injects fuel in the intake stroke after the sealed period of the combustion chamber 11 has elapsed. As the fuel concentration is high on heavy load, a proper compression self-ignition timing can be obtained even if stratification of the fuel mixture under a medium negative load is not performed. Therefore, in the intake stroke injection, the injection timing is fixed without depending on the load.

At the same time, the rotation speed N of the engine 10 also affects the compression self-ignition timing. As the time required for the composition change of the fuel does not vary even if the rotation speed N of the engine 10 is changed, if fuel injection is set to take place at a specific crank angle, the compression self-ignition timing will vary with the rotation speed. For example, when the rotation speed is low, the crank angle at which compression self-ignition starts advances. Conversely, if the rotation speed N is high, the crank angle at which compression self-ignition starts is retarded. For this reason, in order that compression self-ignition is induced at the same crank angle without depending on rotation speed, the fuel injection timing must be varied depending on the rotation speed.

Referring to FIGS. 6A and 6B, the electronic control unit 1 applies three kinds of fuel injection timing as the rotation speed N of the engine 10 varies during compression self-ignition combustion. These are a sealed period injection, a compression stroke injection and an intake stroke injection similar to those of FIGS. 5A and 5B.

In the low rotation speed region, an intake stroke injection is performed with a fixed timing.

In the medium rotation speed region, a compression stroke injection is performed. In the compression stroke injection, the injection timing is also retarded the higher the engine rotation speed N. If the injection timing is retarded, the degree of fuel concentration around the spark plug 20 will become higher when the vicinity of compression top dead center (TDC) is reached. Hence, by shortening the ignition delay time from injection to firing, compression self-ignition is made to occur with the same timing without depending on the variation of rotation speed N.

The sealed period injection is performed in the high rotation speed region. In the sealed period injection, the fuel injection timing is also varied according to the rotation speed N. When the rotation speed N is low, the composition change period when the fuel injection is performed at a fixed crank angle becomes longer than in the case where the rotation speed N is high.

Therefore, the injection timing is retarded the lower the rotation speed N so that the composition change level of the gasoline near compression TDC becomes almost equal.

In the above description, the relation of the engine load T and injection timing, and the relation of the rotation speed N and the injection timing, were treated individually, but in practice the fuel injection timing must be determined depending on both the engine load T and rotation speed N. Therefore, the ECU 1 determines the fuel injection timing by looking up a map shown in FIG. 8 which combines the characteristics shown in FIG. 5A with those shown in FIG. 6A. By setting the fuel injection timing of the fuel injector 19 based on this map, compression self-ignition can always be made to occur in the vicinity of compression TDC even if the engine load T and the engine rotation speed N vary.

Figure 7:
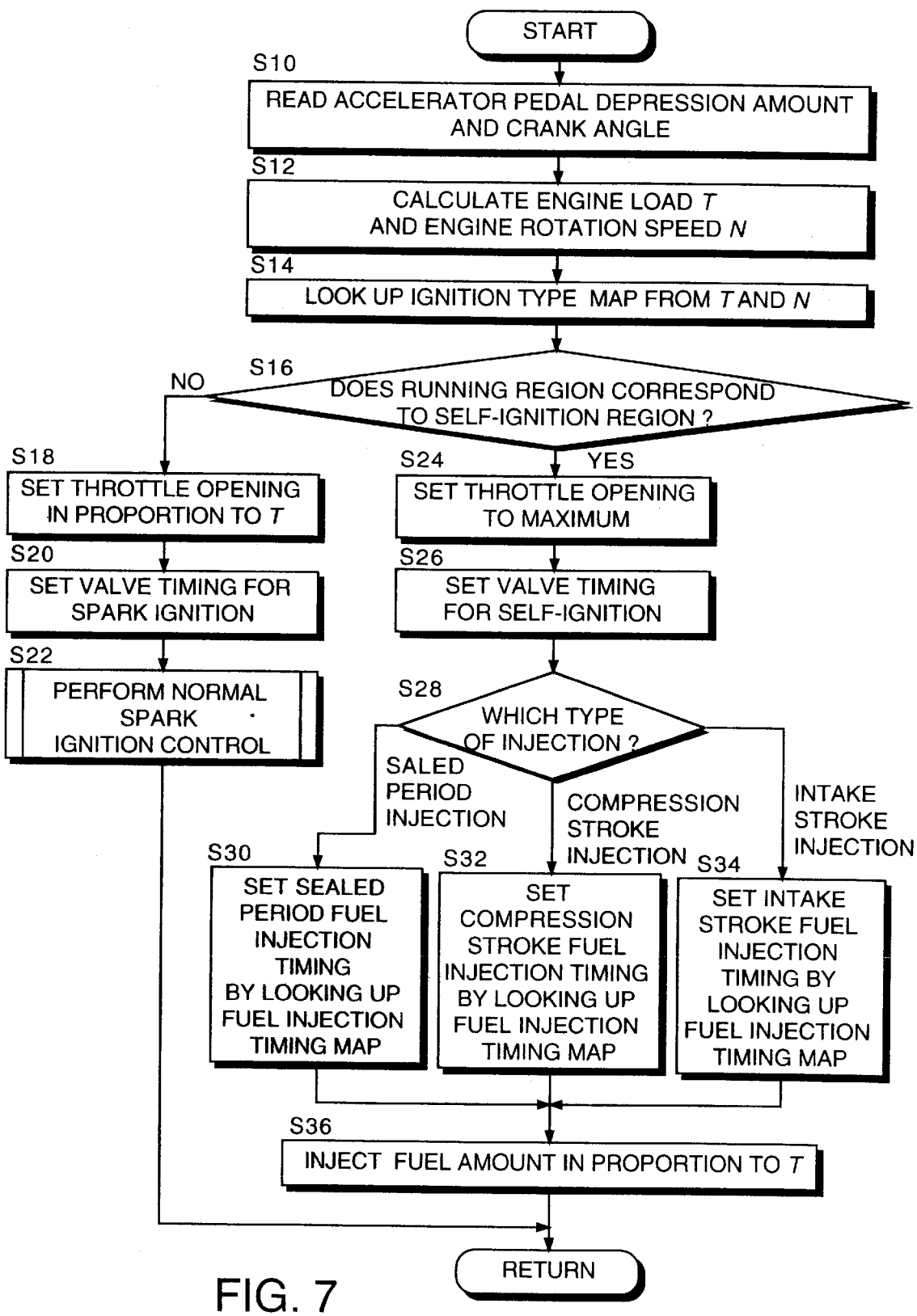
FIG. 7 is a flowchart describing a control routine of the fuel injection timing and an ignition type change-over performed by an electronic control unit according to this invention.

The ECU 1 performs the above-mentioned control by running the routine shown in FIG. 7. This routine will now be described. This routine is performed at an interval of, for example, 10 milliseconds.

First, in a step S10, an accelerator pedal depression amount detected by the accelerator pedal depression sensor 24, and a crank angle detected by a crank angle sensor 23, are read.

In a next step S2, the load T of the engine 10 is calculated from the accelerator pedal depression amount.

Also, the rotation speed N of the engine 10 is calculated from the crank angle variation from the immediately preceding occasion when the routine was performed.

Figure 8:
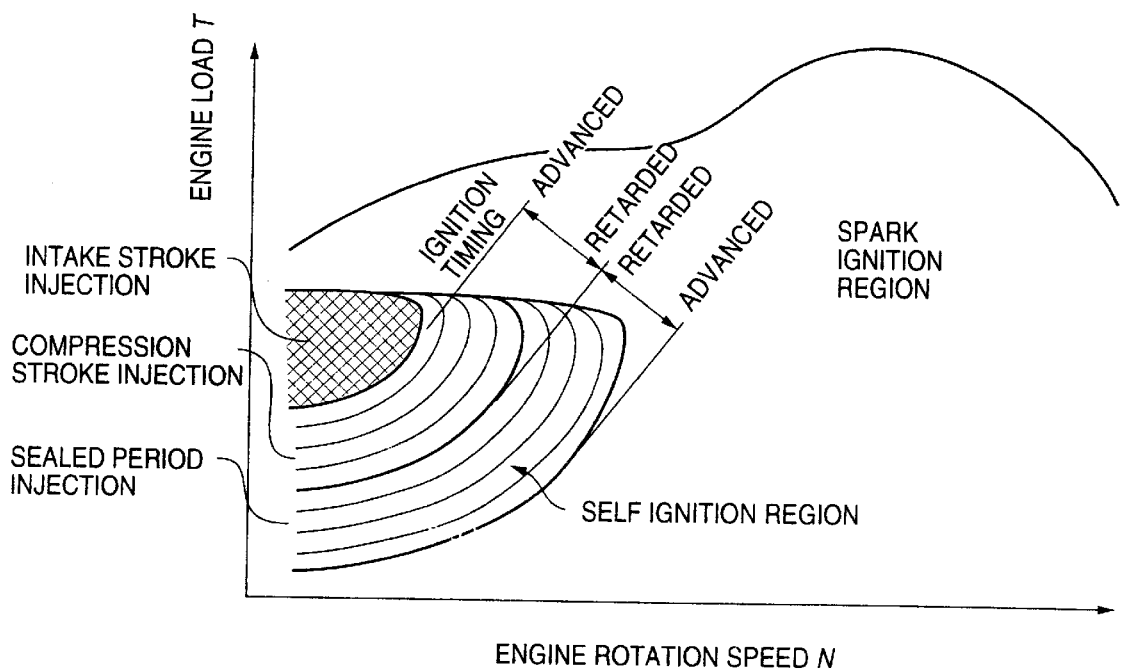
FIG. 8 is a diagram showing the contents of a map of ignition type and fuel injection timing stored by the electronic control unit.
Figure 9:
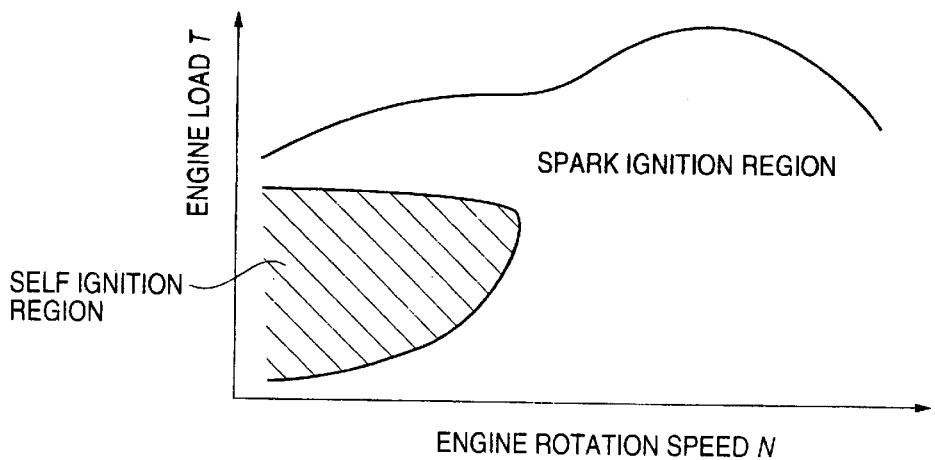
FIG. 9 is a diagram showing the contents of a map of ignition type stored by the electronic control unit.

In the next step S14, it is determined from the map of FIG. 8 whether running conditions correspond to a spark ignition combustion region, or to a compression self-ignition combustion region, based on the load T and rotation speed N. As only the ignition region is read in the step S14, the simplified map shown in FIG. 9 may be used instead of the map of FIG. 8.

In a next step S16, it is determined from the read results whether running conditions correspond to the compression self-ignition combustion region. If they correspond to the compression self-ignition combustion region, the routine proceeds to a step S24. If they do not correspond to the compression self-ignition combustion region, the routine proceeds to a step S18.

The processing from the step S18 to a step S22 is equivalent to control for ordinary spark ignition combustion. In the step S18, the opening of the throttle 22 is set in proportion to the load T, and in the next step S20, the open/close timings of the intake valve 14 and the exhaust valve 17 are set to valve timings for spark ignition combustion shown in FIG. 2A. Also, in the next step S22, the fuel injection amount and the fuel injection timing of the fuel injector 19, and the spark timing of the spark plug 20, are controlled as in an ordinary spark ignition gasoline engine, and the routine is terminated.

On the other hand, the processing from the step S24 to a step S36 is control for compression self-ignition combustion.

First, in the step S24, the opening of the throttle 22 is set to the maximum.

In the next step S26, the open/close timings of the intake valve 14 and exhaust valve 17 are set to valve timings for compression self-ignition combustion with which the valve closing timings of the intake valve 14 and exhaust valve 17 overlap, as shown in FIG. 2B.

In the next step S28, it is again determined whether the running conditions correspond to a sealed period injection, compression stroke injection or intake stroke injection from the engine load T and rotation speed N by looking up the map of FIG. 8.

When it is determined that the running conditions correspond to a sealed period injection in the step S28, the routine proceeds to a step S30. Here, the injection timing is again determined within the limits of the sealed period based on the engine load T and rotation speed N by looking up the map of FIG. 8. The routine then proceeds to the step S36.

When it is determined that the running conditions correspond to a compression stroke injection in the step S28, the routine proceeds to a step S32. Here, the injection timing is again determined within the range of the compression stroke based on the engine load T and rotation speed N by looking up the map of FIG. 8. The routine then proceeds to the step S36.

When it is determined that the running conditions correspond to an intake stroke injection in the step S28, the routine proceeds to a step S34. Here, the injection timing is fixed at a predetermined timing in the intake stroke, and the routine proceeds to the step S36.

In the step S36, after injecting a fuel amount proportional to the engine load Tat the determined injection timing, the routine is terminated.

Next, a second embodiment of this invention will be described referring to FIGS. 10A, 10B, 11A and 11B.

This embodiment is an alternative to the setting of fuel injection timing shown in FIGS. 5A, 5B, and FIGS. 6A, 6B, of the first embodiment.

In this embodiment, when the load T is equal to or greater than a predetermined load in the sealed period injection, a primary injection is performed in the sealed period, and a secondary injection is then performed in the compression stroke, as shown in FIGS. 10A, 10B.

The ratio of the injection amounts of the primary and secondary injections is set to become larger the smaller the load T, in other words, the proportion of the primary injection increases as the load T decreases. If the injection timing of the sealed period injection varies according to the load T as in the case of the first embodiment, the injection may be performed near the exhaust stroke TDC.

When combustion of the immediately preceding cycle is performed under a lean air-fuel ratio, oxygen is present in the burnt gas. As the valve closing timings of the intake valve 14 and exhaust valve 17 overlap as shown in FIG. 2B, the burnt gas which remains in the combustion chamber 11 is compressed in the latter half of the exhaust stroke. If fuel injection is performed when burnt gas containing oxygen is compressed, there is a slight possibility that the injected fuel will ignite. This embodiment eliminates such a possibility. The reason why the proportion of the primary injection is increased when the load T is low, is that the injection amount is small at low load, and it is necessary to change the composition of the gasoline fuel to a high level in order that compression self-ignition occurs near compression TDC.

Figure 11A:
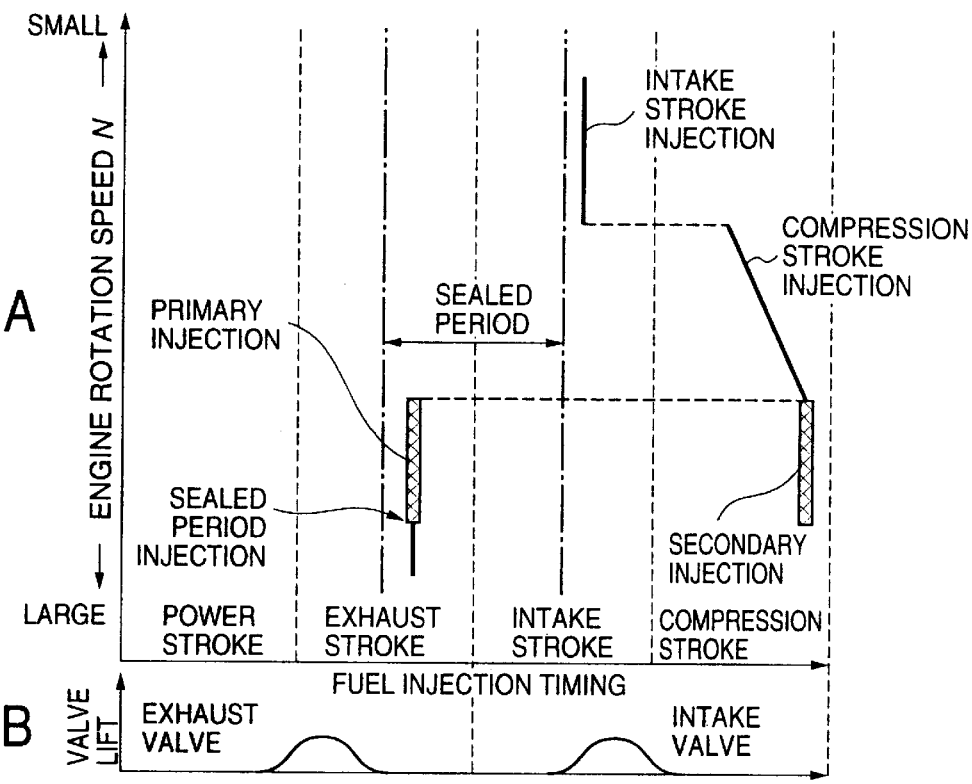
FIGS. 11A, 11B are similar to FIGS. 6A, 6B, but showing the second embodiment of this invention.
Figure 11B:
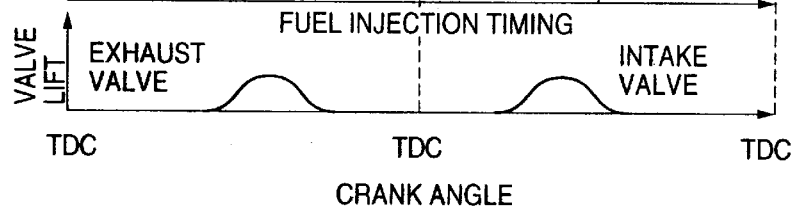

According to this embodiment, the determination of whether or not the primary and secondary injections are to be performed is made based also on the engine rotation speed N as shown in FIGS. 11A and 11B.

Further, when the primary and secondary injections are determined to be performed, the ratio of the primary and secondary injections is determined depending also on the engine rotation speed N. Specifically, the proportion of the primary injection increases the larger the rotation speed N. The time from injection to compression self-ignition is shorter the higher the rotation speed N, therefore the time which is available for composition change is also shorter.

Consequently, compression self-ignition is made to occur with the same timing by increasing the proportion of the primary injection in which composition change takes place.

Since the determination of whether or not the primary and secondary injections are to be performed as well as the determination of the ratio of the primary injection amount and the secondary injection amount are made depending on both the engine load T and engine rotation speed N, the maps of FIGS. 10A and 11A should be integrated into a map and the determinations should be made by referring to the integrated map, similar to the case of the first embodiment where the map of FIG. 5A and the map of FIG. 6A are integrated into the map of FIG. 8.

Next, a third embodiment of this invention will be described referring to FIGS. 12A–12D and FIG. 13.

Regarding hardware, a compression self-igniting gasoline engine 10A according to this embodiment differs from the engine 10 of the first and second embodiments in that the intake air of the engine 10A is turbo-charged by a turbo-charger.

On the other hand, regarding software, it differs from the first and second embodiments in that compression self-ignition combustion is performed only in the low load region, spark ignition of the fuel injected in the compression stroke is performed in the medium load region, and spark ignition of the fuel injected in the intake stroke is performed in the high load region. The valve timings of the intake valve 14 and exhaust valve 17 are varied according to the load T, and in the low load region when compression self-ignition combustion is performed, the period during which the combustion chamber 11 is sealed is set from when the exhaust valve 17 closes during the exhaust stroke to when the intake valve 14 opens in the intake stroke, as shown in FIGS. 12A–12D. That is, the characteristics of the first embodiment shown in FIG. 2B are applied.

On the other hand, under medium and high load when spark ignition combustion is performed, the valve opening timings of the intake valve 14 and exhaust valve are made to overlap near compression top dead center (TDC) of the exhaust stroke as shown in FIG. 2A of the first embodiment.

In compression self-ignition combustion, the fuel injection timing of the fuel injector 19 is fixed at a predetermined timing in the sealed period. At the same time, in compression self-ignition combustion, the spark plug 20 performs auxiliary sparking. The injection timing of the compression stroke injection is fixed at a predetermined timing in the compression stroke. Likewise, the injection timing of the intake stroke injection is fixed at a predetermined timing in the intake stroke. Also, in spark ignition combustion, the timing of spark ignition by the spark plug 20 is fixed near compression TDC.

As a result, in the medium load region, stratified combustion by spark ignition takes place, and in the high load region, uniform combustion by spark ignition takes place.

Figures 12A, 12B, 12C, 12D:
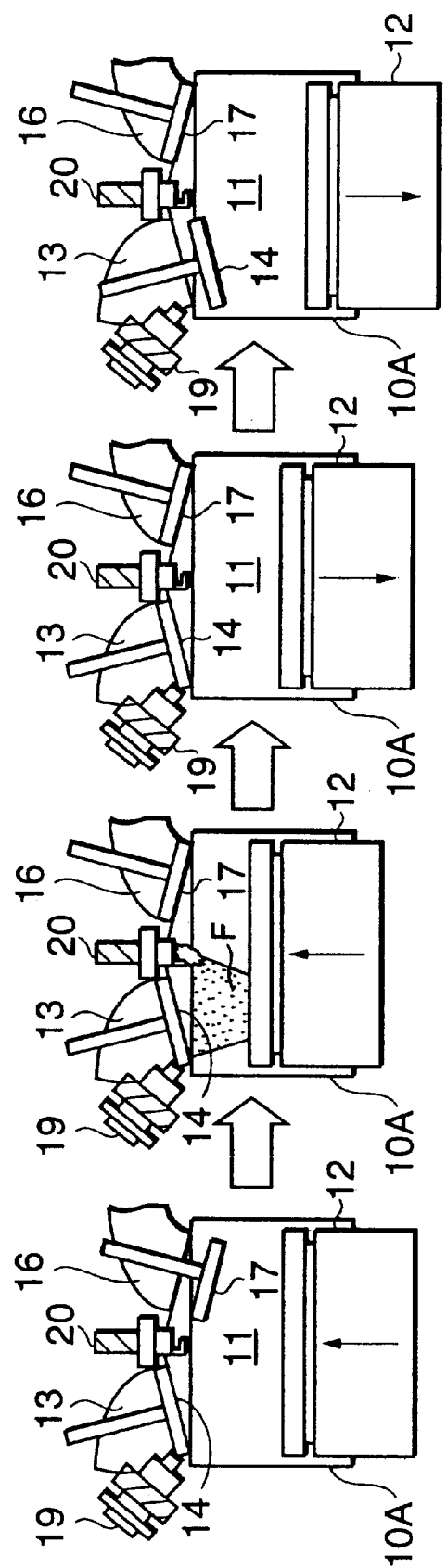
FIGS. 12A–12D are diagrams showing various states of the combustion chamber of a compression self-igniting gasoline engine according to a third embodiment of this invention, when the engine is running on low load.
Figure 13:
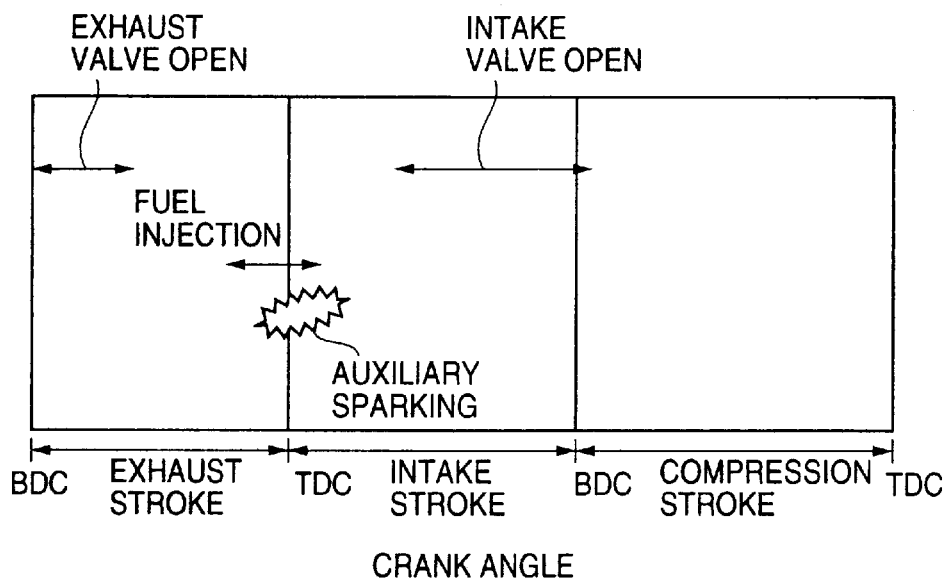
FIG. 13 is a timing chart describing the valve lift, fuel injection timing, and a spark timing, of the engine according to the third embodiment.

When a sealed period injection is performed, the spark plug 20 performs auxiliary sparking with a timing almost equal to that of the sealed period injection in the sealed period, as shown in FIG. 12C and FIG. 13. This auxiliary sparking confers a large amount of energy to the burnt gas around the electrode of the spark plug 20, activates some of the oxygen molecules in the burnt gas, and generates free radicals. As the free radicals have unpaired electrons, their electrical balance is unstable and their reactivity is very high, they cleave the C—C bonds of the fuel molecules in the hydrocarbon system, and tend to replace H in C—H bonds. Due to these reactions, the free radicals finally become aldehydes. This change promotes the combustion reaction by self-ignition of the fuel mixture in the vicinity of compression top dead center (TDC). As a result of this promotion of the combustion reaction by free radicals, stable compression self-ignition combustion is performed in this engine 10A up to high rotation speeds even when the compression ratio is set to 13 or less.

Also, as the valve timings are set to provide a sealed period, a large amount of burnt gas remains in the combustion chamber 11 during compression self-ignition. Therefore, the oxygen concentration of the fuel mixture of injected fuel is low, and the combustion chamber 11 does not become excessively hot due to combustion of fuel mixture.

Further, as compression self-ignition is simultaneous multipoint ignition unlike spark ignition, there is no local heating of parts due to flame propagation as in the case of spark ignition.

For this reason, generation of nitrogen oxides (NOx) can be suppressed. Still further, as combustion is performed again with a large amount of burnt gas remaining in the combustion chamber 11, the unburnt hydrocarbon (HC) contained in the burnt gas can be burnt, and the discharge of hydrocarbons (HC) is thereby reduced.

Figure 14:
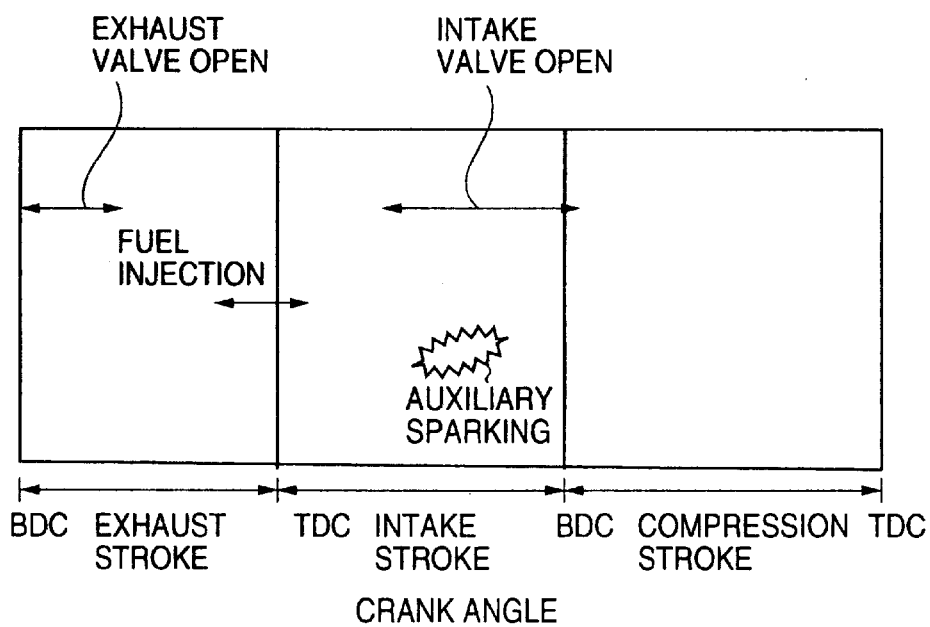
FIG. 14 is similar to FIG. 13, but showing a fourth embodiment of this invention.

Next, a fourth embodiment of this invention will be described referring to FIG. 14.

The only difference of this embodiment from the third embodiment is in the timing of the auxiliary sparking by the spark plug 20 during sealed period injection. According to this embodiment, the auxiliary spark timing is set between the opening of the intake valve 14 after the sealed period and bottom dead center (BDC) of the intake stroke.

According to this embodiment, due to the opening of the intake valve 14, auxiliary sparking takes place when a large amount of oxygen is introduced into the combustion chamber 11, and also in this embodiment, formation of free radicals is promoted by the auxiliary sparking as in the third embodiment.

Next, a fifth embodiment of this invention will be described referring to FIG. 15.

In the third embodiment, the fuel injection amount of the fuel injector 19 decreases as the load T decreases.

If the fuel injection amount is reduced, aldehydes may not be properly formed even if auxiliary sparking is performed.

Figure 15:
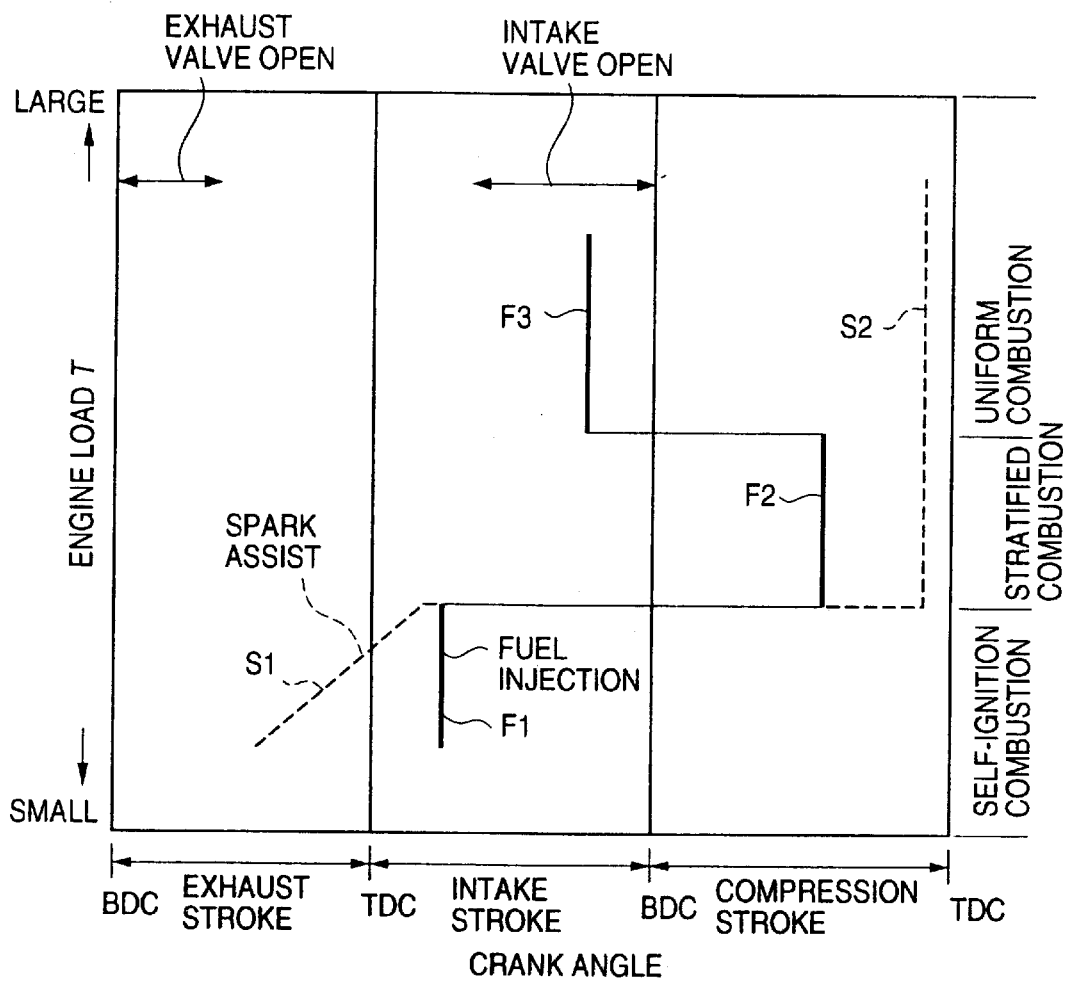
FIG. 15 is a diagram describing the relation between the engine load, valve lift, fuel injection timing and a spark timing of a compression self igniting gasoline engine according to a fifth embodiment of this invention.

Therefore, in this embodiment, as shown in FIG. 15, the timing S1 of the auxiliary sparking for the compression self-ignition combustion is advanced the lower the load T. The remaining features of the construction are the same as those of the third embodiment.

Although the injection amount is small and the fuel mixture becomes lean under low load, according to this embodiment the auxiliary spark timing is advanced, so more time is available after auxiliary sparking for the proliferation of free radicals. In the figure, F1, is the fuel injection timing under low load, F2 is the fuel injection timing under medium load, and F3 is the fuel injection timing under high load. S2 shows the spark timing of the spark plug 20 under medium load and high load.

Figure 16:
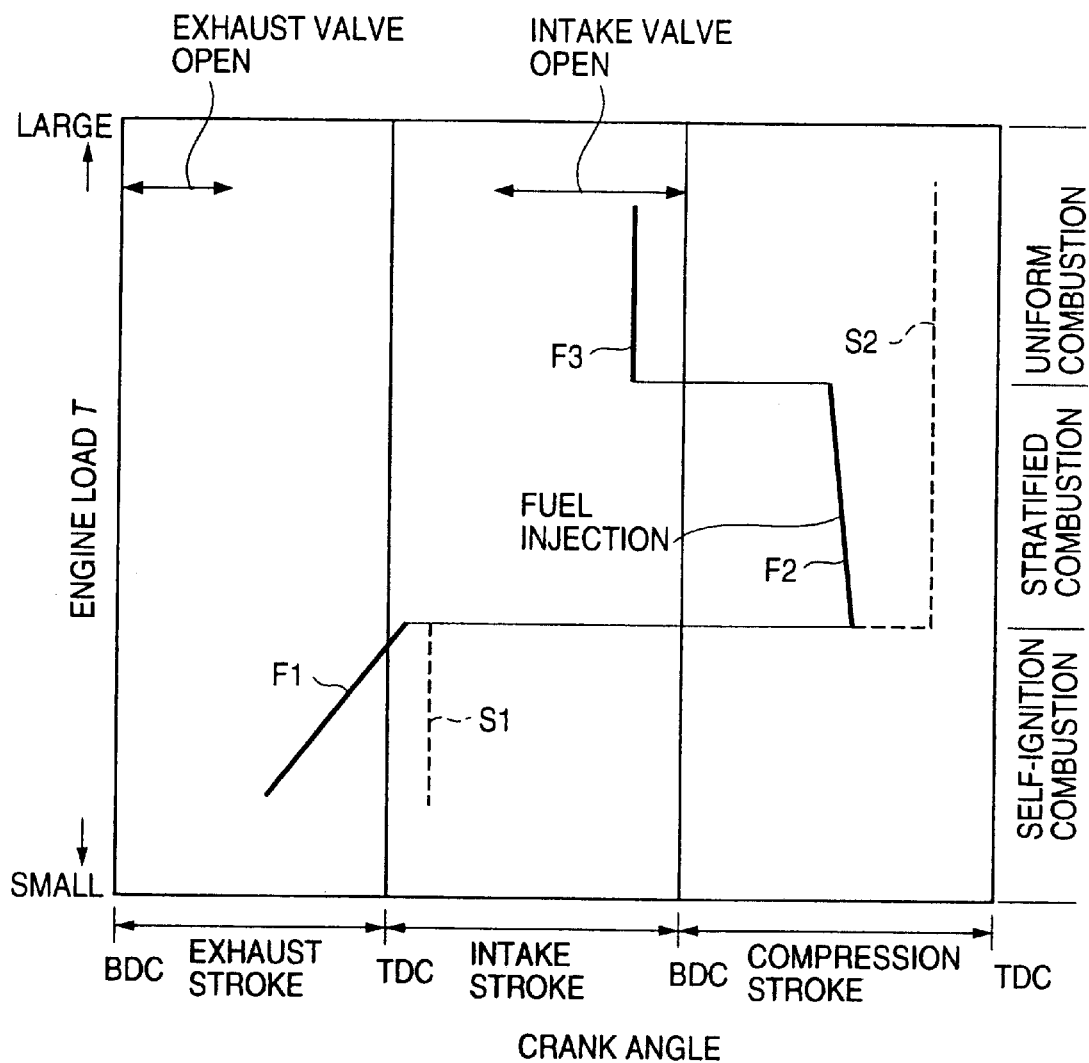
FIG. 16 is similar to FIG. 15, but showing a sixth embodiment of this invention.

Next, a sixth embodiment of this invention will be described referring to FIG. 16.

In this embodiment, by varying the injection timing of the fuel injector 19 of the sealed period injection according to the load as in the first embodiment, a fixed compression self-ignition timing is obtained for different loads. Further, formation of free radicals is promoted by performing the auxiliary sparking at a timing shown by S1 in the figure. The remaining features of the construction are the same as those of the third embodiment. Also in this embodiment, composition change of the fuel injected in the sealed period is performed to a high level by the action of the free radicals due to auxiliary sparking, and the compression self-ignition characteristic of the fuel mixture is enhanced.

However, if the rotation speed N of the engine 1 is high, the time from fuel injection to auxiliary sparking at the same crank angle will become shorter. It is thus also desirable to advance the injection timing as the rotation speed N becomes higher, as in the first embodiment, in order to make the time from injection to auxiliary sparking constant.

Figure 17:
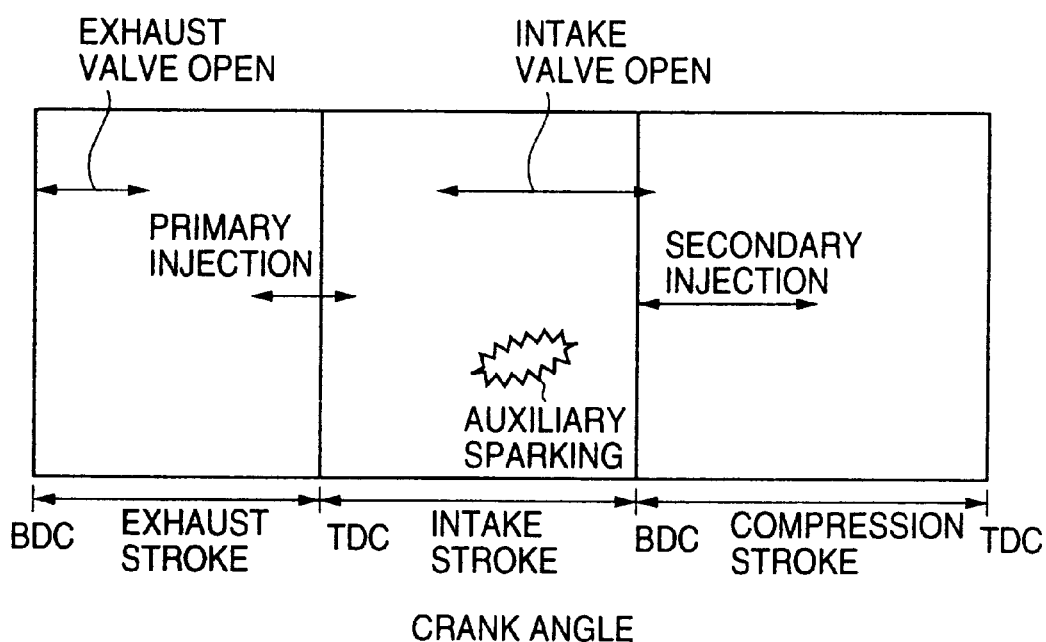
FIG. 17 is similar to FIG. 13, but showing a seventh embodiment of this invention.

Next, a seventh embodiment of this invention will be described referring to FIG. 17.

In this embodiment, the fuel injection for compression self-ignition combustion in the fourth embodiment is divided into a primary injection performed in the sealed period, and a secondary injection performed in the compression stroke of the piston 12. Regarding the fuel injected in the primary injection, free radicals formed by auxiliary sparking of the spark plug 20 after the end of the sealed period cause a composition change of the gasoline. On the other hand, the fuel injected in the secondary injection in the compression stroke produces an enriched fuel concentration layer in the combustion chamber 11. Consequently, the combustion in the combustion chamber 11 is stratified combustion, and generation of hydrocarbons (HC) by wall surface quenching in the combustion chamber 11 is suppressed by the stratified combustion.

According to the above embodiments, the compression ratio of the compression self-ignition engine can be set equal to or less than 13. Further, due to the composition change of fuel by fuel injection into the hot gas, and formation of free radicals by auxiliary sparking, compression self-ignition is possible even during a cold start of the engine 10.

The contents of Tokugan Hei 11-131671, with a filing date of May 12, 1999 in Japan, and Tokugan Hei 11-172752, with a filing date of Jun. 18, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings. For example, the compression ratio is not necessarily set to 13 or less. It may be set to a larger value according to the bore stroke ratio or maximum water temperature of the engine.

The embodiments of this invention in which an exclusive property or privilege is claimed are defined as follows.

What is claimed is:

1. A compression self-igniting gasoline engine wherein stroke cycles comprising an intake stroke, a compression stroke, a power stroke and an exhaust stroke are repeated sequentially by a piston, and self-ignition of a fuel mixture is performed by compression of the fuel mixture in the compression stroke, comprising:

a fuel injector facing the combustion chamber;

an intake valve which introduces intake air to the combustion chamber;

an exhaust valve which ejects burnt gas from the combustion chamber;

a sensor which detects the strokes of the piston;

a valve timing adjustment mechanism which varies an open/close timing of the intake valve and the exhaust valve; and a microprocessor programmed to:

control the valve timing adjustment mechanism so that a sealed period when both the exhaust valve and the intake valve are closed, appears near top dead center of the exhaust stroke; and control the fuel injection timing of the fuel injector so that the fuel is injected into the combustion chamber in the sealed period.

2. A compression self-igniting gasoline engine as defined in claim 1, wherein the engine further comprises a sensor which detects an engine load, and the microprocessor is further programmed to advance the fuel injection timing in the sealed period the lower the engine load.

3. A compression self-igniting gasoline engine as defined in claim 1, wherein the engine further comprises a sensor which detects an engine rotation speed, and the microprocessor is further programmed to advance the fuel injection timing in the sealed period the higher the engine rotation speed.

4. A compression self-igniting gasoline engine as defined in claim 1, wherein the engine further comprises a sensor which detects an engine load, and the microprocessor is further programmed to control the fuel injection timing of the fuel injector so that fuel injection is performed when the intake valve is open after the end of the sealed period without performing fuel injection during the sealed period, when the engine load is greater than a predetermined value.

5. A compression self-igniting gasoline engine as defined in claim 1, wherein the engine further comprises a sensor which detects an engine load, and the microprocessor is further programmed to control the fuel injection timing of the fuel injector to perform a primary fuel injection during the sealed period, and perform a secondary fuel injection after the intake valve has opened, when the engine load is greater than a predetermined value.

6. A compression self-igniting gasoline engine as defined in claim 5, wherein the microprocessor is further programmed to control the fuel injection amount of the fuel injector so that the ratio of the primary fuel injection and secondary fuel injection is larger the lower the engine load.

7. A compression self-igniting gasoline engine as defined in claim 5, wherein the engine further comprises a sensor which detects an engine rotation speed, and the microprocessor is further programmed to control the fuel injection amount of the fuel injector so that the ratio of the primary fuel injection and secondary fuel injection is larger the higher the engine rotation speed.

8. A compression self-igniting gasoline engine as defined in claim 1, wherein the engine further comprises a spark plug facing the combustion chamber, and the microprocessor is further programmed to control the spark plug to perform an auxiliary sparking during the sealed period.

9. A compression self-igniting gasoline engine as defined in claim 8, wherein the engine further comprises a sensor which detects an engine load, and the microprocessor is further programmed to advance the spark timing of the spark plug in the sealed period the lower the engine load.

10. A compression self-igniting gasoline engine as defined in claim 8, wherein the engine further comprises a sensor which detects an engine rotation speed, and the microprocessor is further programmed to advance the spark timing of the spark plug in the sealed period the higher the engine rotation speed.

11. A compression self-igniting gasoline engine as defined in claim 1, wherein the engine further comprises a spark plug facing the combustion chamber, and the microprocessor is further programmed to control the spark plug to perform an auxiliary sparking after the sealed period ends and the intake valve has opened.

12. A compression self-igniting gasoline engine as defined in claim 1, wherein the engine further comprises a sensor which detects an engine startup, and the microprocessor is further programmed to control the valve timing adjustment mechanism so that a sealed period when both the exhaust valve and the intake valve are closed appears in the vicinity of top dead center of the exhaust stroke, and to control the fuel injection timing of the fuel injector, during engine startup.

13. A compression self-igniting gasoline engine as defined in claim 1, wherein the compression ratio of the engine is set less than 13.

14. A compression self-igniting gasoline engine as defined in claim 13, wherein the engine further comprises a spark plug facing the combustion chamber and a sensor which detects an engine load, and the microprocessor is further programmed to control the fuel injector and spark plug when the engine load is larger than a predetermined load, so that fuel is injected after the end of the sealed period, and the spark plug ignites the fuel near the end of the compression stroke.

15. A compression self-igniting gasoline engine wherein stroke cycles comprising an intake stroke, a compression stroke, a power stroke and an exhaust stroke are repeated sequentially by a piston, and self-ignition of a fuel mixture is performed by compression of the fuel mixture in the compression stroke, comprising:

a fuel injector facing the combustion chamber;

an intake valve which introduces intake air to the combustion chamber;

an exhaust valve which ejects burnt gas from the combustion chamber;

means for detecting the strokes of the piston;

means for varying an open/close timing of the intake valve and the exhaust valve;

means for controlling the valve timing adjustment mechanism so that a sealed period when both the exhaust valve and the intake valve are closed, appears near top dead center of the exhaust stroke; and means for controlling the fuel injection timing of the fuel injector so that the fuel is injected into the combustion chamber in the sealed period.

\* \* \* \* \*